United States Patent [19]

Strautnieks et al.

[11] Patent Number: 4,592,562

[45] Date of Patent: Jun. 3, 1986

[54] WHEELCHAIR TRANSFER

[75] Inventors: Maris Strautnieks, Brighton; Maria A. Snel, Seacombe Gardens, both of Australia

[73] Assignee: Friends of the Disabled Assn., Inc., Seacombe Gardens, Australia

[21] Appl. No.: 519,677

[22] Filed: Aug. 2, 1983

[30] Foreign Application Priority Data

Aug. 2, 1982 [AU] Australia .............................. PF5163

[51] Int. Cl.⁴ ............................................... B60N 1/08

[52] U.S. Cl. .................... 280/242 WC; 280/289 WC; 297/DIG. 4; 414/921

[58] Field of Search ............... 280/242 WC, 289 WC, 280/647, 648, 657; 297/DIG. 4; 414/340, 343, 396, 921

[56] References Cited

U.S. PATENT DOCUMENTS

| | | | |
|---|---|---|---|
| 2,609,862 | 9/1952 | Pratt | 297/DIG. 4 |
| 3,749,192 | 7/1973 | Karchak, Jr. et al. | 297/DIG. 4 |
| 3,758,894 | 9/1973 | Finley | 297/DIG. 4 X |
| 3,865,427 | 2/1975 | Delaney | 247/DIG. 4 X |
| 4,170,368 | 10/1979 | Southward et al. | 280/242 WC |
| 4,183,578 | 1/1980 | Naganawa | 297/DIG. 4 |
| 4,266,305 | 5/1981 | Kavaloski et al. | 297/DIG. 4 X |
| 4,343,482 | 8/1982 | Wegner | 297/DIG. 4 X |
| 4,354,791 | 10/1982 | Antonellis | 297/DIG. 4 X |
| 4,452,327 | 6/1984 | Mowat et al. | 280/242 WC |
| 4,477,098 | 10/1984 | Minnebraker | 280/242 WC |

FOREIGN PATENT DOCUMENTS

| | | | |
|---|---|---|---|
| 2731952 | 1/1978 | Fed. Rep. of Germany | 280/242 WC |

*Primary Examiner*—John J. Love
*Assistant Examiner*—Charles R. Watts
*Attorney, Agent, or Firm*—Henry Sternberg; Bert J. Lewen

[57] ABSTRACT

A transfer device for transferring a patient from a wheelchair to a motor vehicle seat, which comprises a pair of interlocking trays, one on a frame of the wheelchair and one on the motor vehicle seat, the trays having aligned tracks which are engaged by the wheelchair seat, which upon being released from the wheelchair frame, is movable from the wheelchair frame onto the tray on the motor vehicle seat.

16 Claims, 11 Drawing Figures

Figure 1:
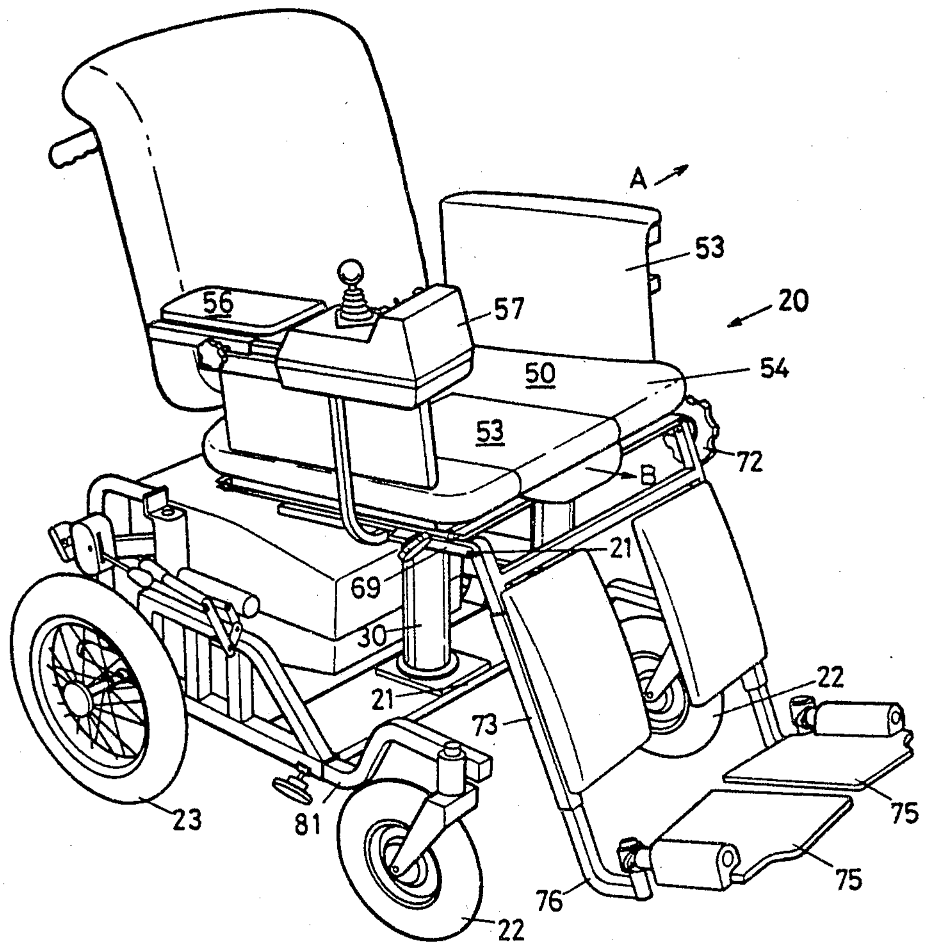

42
6
6
7
7
44
45
47
46
43
44
42
43
54
43
43
38
67
47
47
50
43
67
43
50
51
52
53
38
54
63
64
65
62

WHEELCHAIR TRANSFER

This invention relates to improvements in wheelchairs, including a transfer device for transferring a patient from a wheelchair.

BACKGROUND OF THE INVENTION

In certain situations, difficulty is experienced in transferring a patient to and from a wheelchair. This applies for example in the case of transferring a patient to a bath, but one of the most difficult problems has been transferring a patient into a motor vehicle. There are a number of reasons for this. Firstly, the door space is relatively shallow, and the patient must be moved into a crouched position before transfer. Secondly, if a patient is moved from the seat of a wheelchair which for the time being remains at the same height onto the seat of the motor vehicle, the motor vehicle seat becomes depressed as the patient's weight is moved onto it, and this can result in a jolt which in some instances is quite painful.

Various attempts have been made to overcome the abovementioned problem, and included amongst those attempts have been devices which interengage with one another so that at least for the time being a track is coupled to the wheelchair by being hooked together therewith, but even these have not been fully accepted as being completely satisfactory.

BRIEF SUMMARY OF THE INVENTION

In this invention, there is provided a transfer device for transferring a patient from a wheelchair to a motor vehicle seat, which comprises a pair of interlocking trays, one on a frame of the wheelchair and one on the motor vehicle seat, the trays having aligned tracks which are engaged by the wheelchair seat, which upon being released from the wheelchair frame, is movable from the wheelchair frame onto the tray on the motor vehicle seat.

If the tray in the motor vehicle is provided with means which engage the side of the seat, the tray on the wheelchair can be approximately aligned, and as the load is transferred from one tray to the other, there is merely a minor tilting of the transfer seat.

More specifically the invention consists of improvements comprising a wheelchair main frame assembly, a seat support frame assembly, and means interconnecting the main frame assembly and seat support frame assembly, a seat transfer device having a pair of seat supports, one of said seat supports comprising a portion of said seat support frame assembly and the other of said seat supports being a vehicle seat support and having a vehicle seat engaging surface of such size and shape that it can be supported by a motor vehicle seat between the front and rear edges thereof, each seat support having surfaces thereon defining a pair of tracks which align with the tracks of other seat supports when positioned end to end therewith, a transfer seat having track engagement means which engage said tracks, and releasable retention means between the transfer seat and said seat support frame assembly releasably retaining the transfer seat thereto.

In the transfer of a transfer seat from a wheelchair to a motor vehicle seat or vice versa, as said above it is desirable to have a transfer seat so that tilting is only gradual, but it is also desirable that the patient should be movable as easily as possible and in one embodiment of this invention the tracks on the respective trays are formed by grooves, and wheels or low friction rods engage the grooves and support the wheeled transfer seat for lateral movement. This reduces to a minimum the amount of effort required to move a patient.

Figure 2:
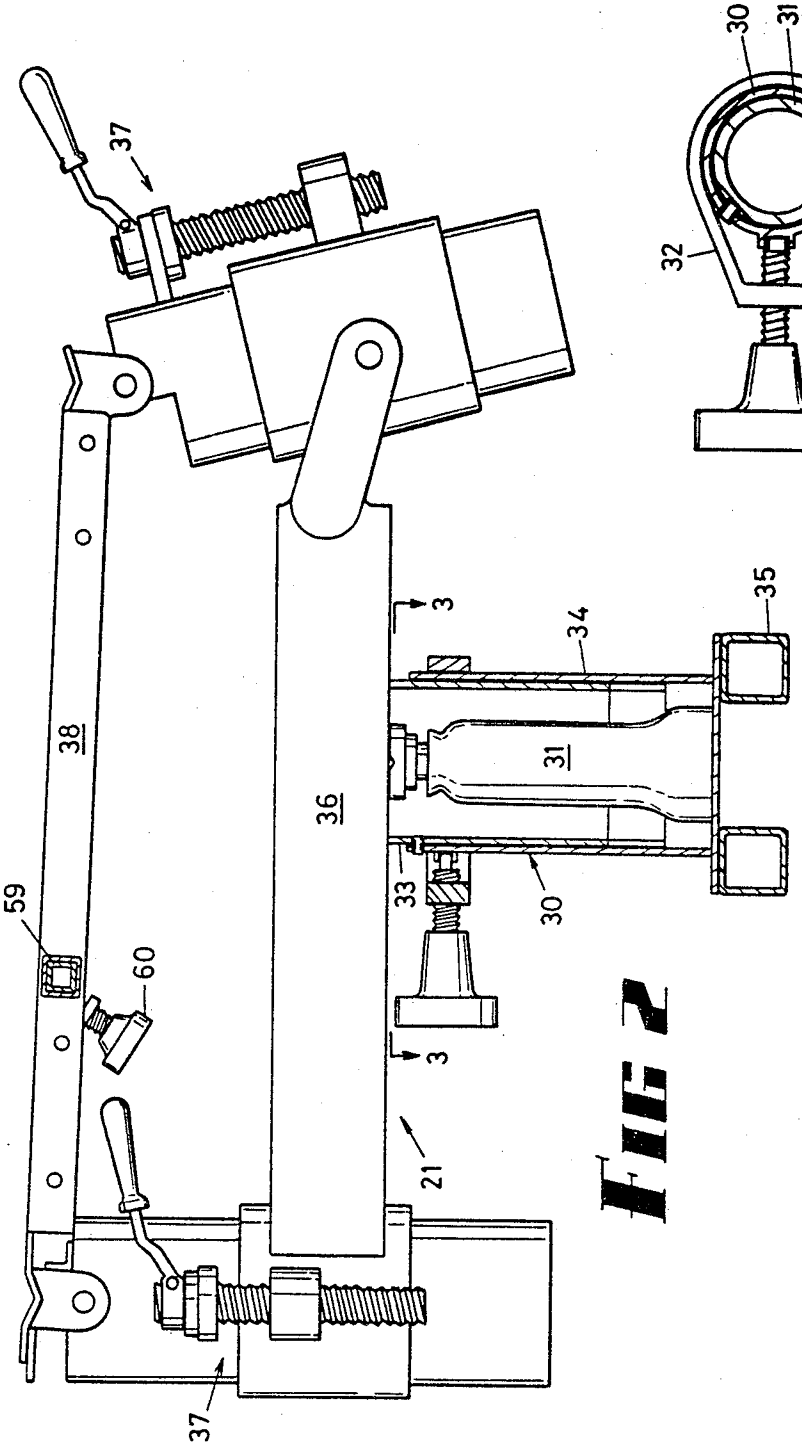
Figure 3:
Figures 4, 5, 6, 7:
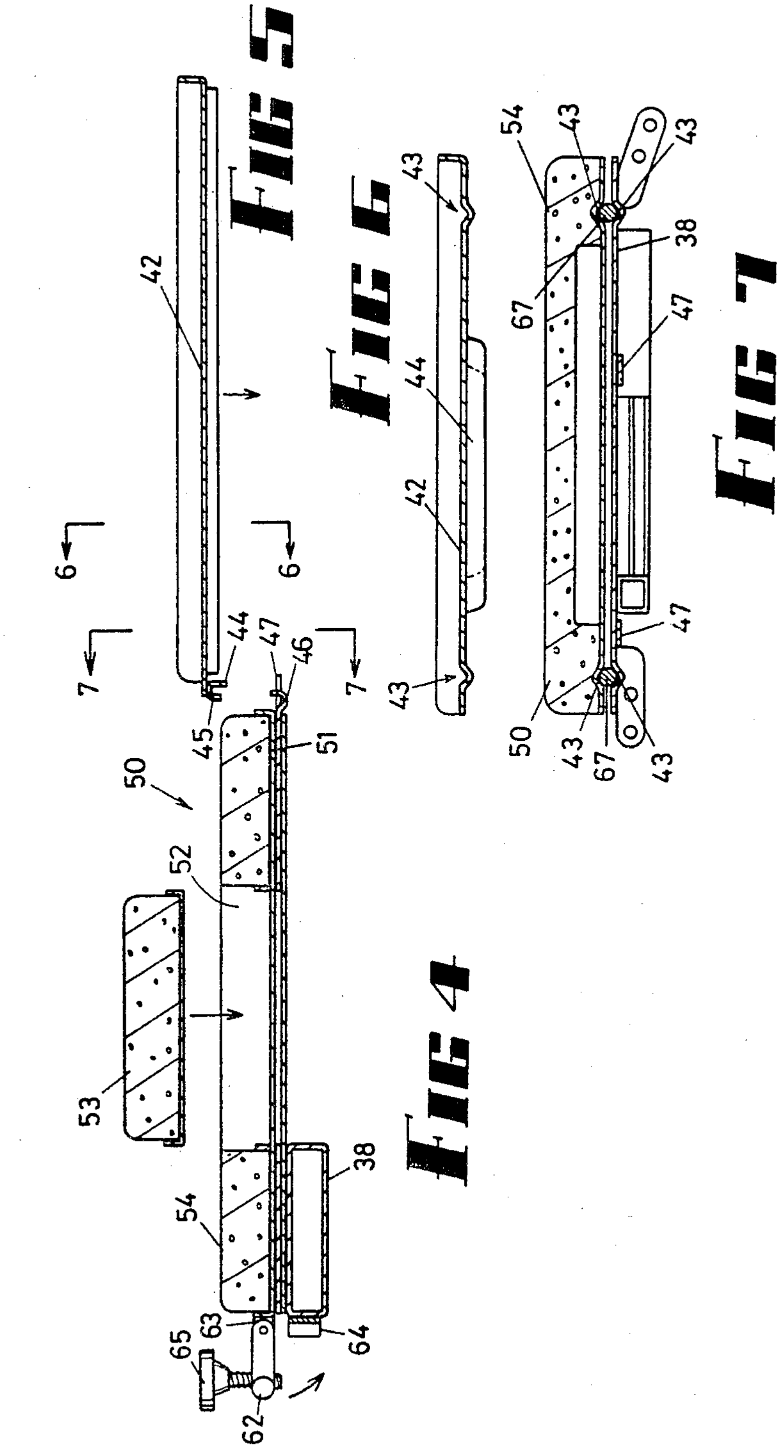
Figure 8:
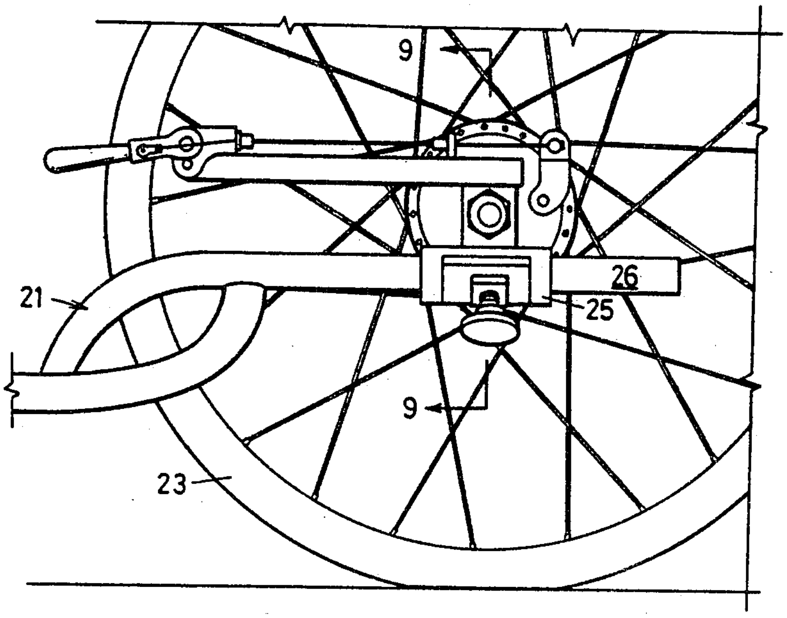
Figure 9:
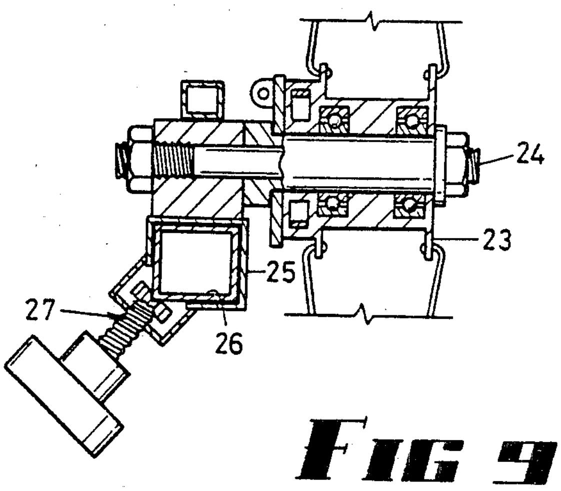
Figure 10:
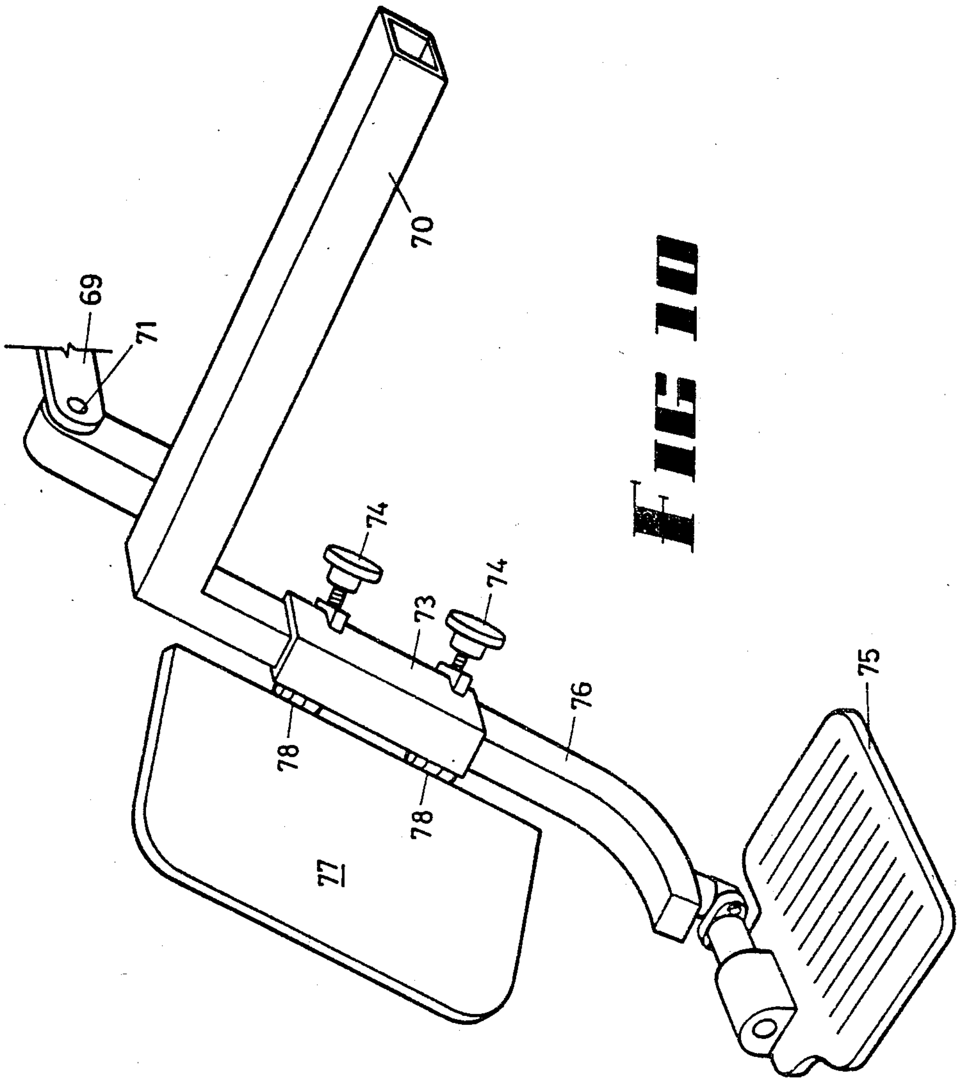
Figure 11:
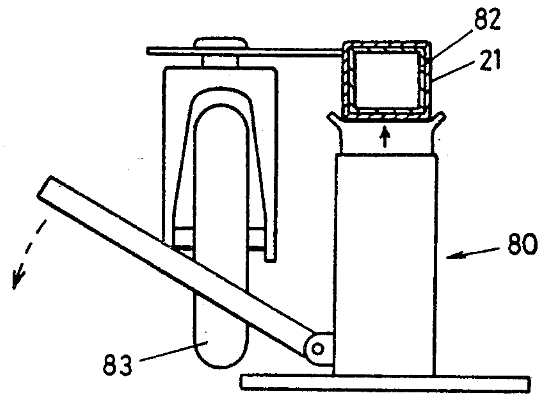

An embodiment of the invention is described hereunder in some detail with reference to, and is.illustrated in, the accompanying drawings in which:

FIG. 1 is a perspective view of a wheelchair having the improvements of this invention, FIG. 2 is a partly sectioned side elevation which illustrates portion of the wheelchair frame which carries one of the seat support frames, FIG. 3 is a section taken on line 3—3 of FIG. 2, FIG. 4 is a diagrammatic elevational section through a seat support frame (being that seat support frame which is also illustrated in FIG. 2), and a transfer seat thereon, FIG. 5 is a section through a second seat support frame which is interengageable end to end with the seat support frame of FIG. 4, FIG. 6 is a section on line 6—6 of FIG. 5, FIG. 7 is a section on line 7—7 of FIG. 6, but showing a condition which will exist when two seat support frames are interengaged and the transfer seat has been moved onto the frame of FIG. 5, FIG. 8 is a fragmentary view of a large wheel of the wheelchair, illustrating its location means with respect to the wheelchair frame, FIG. 9 is a section on line 9—9 of FIG. 8, drawn to an enlarged scale, FIG. 10 is a fragmentary view of a foot rest, showing its height adjustment means, and FIG. 11 is a section through portion of the wheelchair frame, showing a simple jack arrangement for lifting the wheelchair frame so that a small wheel subassembly can be removed.

In this embodiment a wheelchair 20 is provided with a wheelchair main frame assembly 21 supported by four wheels, two of which are relatively small wheels 22, either caster wheels or wheels arranged for steering of the wheelchair, and the other two are large wheels 23. The small wheels 22 are relatively low and arranged so htat they can be moved under a bed, motor vehicle or the like, although as described below, these can be replaced by even smaller wheels if required. As shown in FIGS. 8 and 9, the large wheels 23 are supported on axles 24 on slides 25 themselves carried on longitudinal frame members 26 to which respective slides 25 are clamped by clamps 27, the arrangement being such that the large wheels 23 can be moved further away from or closer to the smaller wheels 22, as may be required to prevent tipping of the wheelchair when it is extended, or for moving the wheelchair in confined spaces. As seen in FIGS. 1, 2 and 3, the wheelchair main frame assembly 21 has an upstanding swivel post 30 which embodies a hydraulic jack 31, and also a clamp 32 to inhibit swivelling when that is required. The swivel post 30 itself comprises an inner post 33 and an outer post 34 in which it slides and rotates, slots dividing the upper end of the outer post 34 into a plurality of fingers which clamp against the outer surface of the inner post 33 when clamp 32 is tightened. The outer post 34 is upstanding from a base frame 35, which is that portion of the wheelchair main frame assembly 21 which carries the wheels 22 and 23.

The hydraulic jack 31 is of the automotive type, and is arranged so to be operated by a pump or release valve (not shown), so that it can be extended or retracted, and its upper end supports a seat support frame assembly.

The seat support frame assembly comprises a sub-frame 36 supported by the upper end of jack 31, and a seat support 38. Respective screw jacks 37 are pivotted to the ends of sub-frame 36 and seat support 38, which is a sheet metal tray and thereby positionable at various heights and angles with respect to the wheelchair frame. This facility is valuable, since the patient can be raised for obtaining access to high cupboards, etc., and can also reverse himself to face the opposite direction, sometimes a requirement when a helper is to push him, instead of him propelling himself. The seat support frame assembly also comprises a "loose" seat support being a second sheet metal tray 42 having cross-sectional configuration generally similar to the tray of frame 38 on the wheelchair, that is, including a pair of spaced grooves 43 formed by deformation of the metal of the tray. The "loose" tray 42 is provided with a depending abutment flange 44 which bears against a side wall of a motor vehicle seat and thereby prevents dislodgement of the loose tray when so positioned. This flange 44 defines, with a second flange 45 and the bottom of the tray 42, a shallow groove the walls of which are engageable by an outstanding plate 46 on the seat support 38 of the wheelchair when the wheelchair is positioned at the correct height for transverse movement of a wheeled transfer seat. A pair of tongues 47 are outstanding from the seat support 38, and further assist in locating tray 42 with respect to frame 38.

The transfer seat 50 comprises a sheet of metal 51 having a "U" shaped aperture 52 therein, to form a "toilet seat". The toilet seat aperture 52 is provided with closure means, and comprises a two cushion arrangement so that an invalid can have toilet facilities without necessarily moving from his wheelchair. A central cushion 53 can be removed by sliding forwardly in direction of arrow B, but the invalid can still be supported by its surrounding "U" shaped cushion 54. The central cushion 53 can subsequently be slid back into place beneath the patient, and retained by releasable latch means (not shown).

The wheelchair 20 is provided with two arm rests. Arm rest 56 is fixed with respect to the seat support 38 (FIG. 2), and in a motorised wheelchair, carries the control console 57. However arm rest 58 is carried on square tubular supports 59 (FIG. 2) which slide into frame 38, and are retained by clamp 60. By release of clamp 60, the arm rest 58 can be removed from the seat frame in the direction of arrow A in FIG. 1, this being necessary before the transfer seat 50 can be moved from seat support 38.

As shown in FIG. 4, a "U" shaped locking bracket 62 is hinged to an edge flange 63 of the metal sheet 51, and, when closed over projections 64 of the seat support frame 38, prevents movement therefrom. A locking screw 65 provides additional safety means for this locking. However, when retracted as shown in FIG. 4, the locking bracket allows the transfer seat to move transversely, after the arm rest 58 has been removed.

The transfer seat 50 is provided with a pair of low friction slide rods 67 (or alternatively, a plurality of wheels arranged in two rows). Each rod 67 engages between the grooves 43 of the seat support frame 38 and the metal sheet 51, but is transferable across into the grooves 43 of the tray 42 carried on the seat of a motor vehicle upon lateral movement of the patient.

The seat support 38 is provided with a pair of forwardly extending support bars 69, and the upper ends of an inverted "U" shaped foot rest frame 70 are pivotted to the support bars 69 by pivot pins 71, and further, on one side, by an automobile type adjuster 72, which provides simple means whereby the foot rest position can be varied. The foot rest frame 70 engages a clamping sleeve 73 having clamping screws 74 thereon, so that the height of the foot rests 75 can be varied, the foot rests 75 being carried on support arms 76 also insertable in the sleeves 73. Since some motor vehicle doors do not open a sufficient amount to be convenient, the foot rest assembly, in being made in portions which are telescopically engaged with one another but one can be removed from the other, provides means whereby the patient may be in a crouched position while the transfer moves into a vehicle even though the door opening is not wide. Padded flaps 77 are hinged to the clamping sleeve 73 by hinges 78, and provide leg support means for a patient when the wheelchair is extended.

As shown in FIG. 1, the small wheels 22, although smaller than the large wheels 23, are still sufficiently large to traverse uneven terrain without excessive difficulty to the patient. In some instances they are too large, however, to go beneath the chassis of a motor vehicle, and need to be replaced by smaller wheels. FIG. 11 illustrates a simple jack device 80 which engages beneath the wheelchair main frame 21, allowing the support arm 81 of the wheel sub-assembly having wheels 22 to be removed, and replaced by a support arm 82 to be inserted in its place. Arm 82 supports a very small wheel 83, which can go beneath a motor vehicle chassis, although it is not suitable for traversing rough terrain.

The manner in which the seat is used for transport purposes is as follows:

The "loose" tray is positioned in a motor vehicle with its abutment flange abutting the side wall of a seat, and the tray resting upon the seat, and the footrest is removed. The wheelchair frame is wheeled beneath the floor of the motor vehicle, and the most convenient angle is selected. This positioning can be effected by making use of the steering facilities of the small front wheels, whether they be steering wheels or caster wheels.

The seat is then adjusted to the same height and angle as the tray in the vehicle, and the tongues on the tray of the wheelchair are engaged between the strap and the under surface of the tray in the vehicle. The foot rests are then raised (if necessary). The wheels of the wheelchair are then locked, the seat portion is unlocked from the tray portion on the wheelchair and the seat portion moved across in a lateral direction until the seat portion lies wholly over the tray in the vehicle. A lock is then interengaged between the seat portion and the tray in the vehicle.

The wheelchair can then be removed from the proximity of the side of the vehicle, and in this embodiment the dimensions are such that it is readily stacked in the luggage trunk of the vehicle.

When handle bars are used (as in most instances) they are normally retained projecting upwardly and rearwardly from the two side posts of the wheelchair. However for use of a wheelchair in a motor vehicle, the handle bars are so arranged so that they can be lifted and rotated to be directed towards one another, thus lying transversely and not interfering with the use of the chair in the vehicle.

A consideration of the above embodiment will indicate that the invention has many advantages over prior art. These include the following:

The use of trays with grooves avoids any jolting movement imposed upon the patient, and in all cases whether the patient is transferred into or out of the vehicle, he moves in a "downhill" direction. The use of the interengaging lips avoids the need to hook in the vehicle tray with respect to the wheelchair tray. The foot rest rail is adjustable for angle, as also is the extension foot rest, and one or both of those foot rests can be broken and swivelled to allow use of the device into a vehicle having a relatively small door opening. The use of low friction slide rods (or wheels with ball bearings) ensures that the amount of effort required to effect transverse movement of a patient is minimal. The handle bars can be quickly and easily removed by unscrewing. The use of hydraulic height adjustment, swivel and a lock against swivel greatly facilitates the positioning of a patient both with respect to height and angular position. The seat angle adjustment means is useful not merely for adjusting the angle of the seat with respect to the seat back, but also lifting the patient from the seat, or repositioning the seat to a reclined position. Fore and aft adjustment of the seat back enables the patient to be supported by the seat back already existing in the vehicle. Bed transfer is facilitated, as well as vehicle transfer. The use of the toilet aperture of the base avoids need for continual repositioning of the patient. The use of the two part cushion also reduces the amount of requirement for a patient to be moved for toilet purposes. The extension wheel base provides a facility whereby the patient is kept in his most stable position, and unlikely to be unloaded from the wheelchair even under adverse conditions. The construction illustrated facilitates changing a wheelchair from a motor driven to a hand-propelled chair, or vice versa. By extension of the wheel base, tilting is substantially avoided. However it provides means whereby the wheelchair can be easily stowed in the trunk of a vehicle.

The wheelchair is used in conjunction with an elevating chair within a bath, when the patient is transferred onto the bath chair identically as described above, excepting that in some instances use is made of a short bridging track (for example, hinged to the side of the bath chair), to ensure best stability conditions. The patient is then lowered into a bath for washing, and subsequently lifted from the bath and transferred back to his wheelchair.

We claim:

1. In a wheelchair having a main frame assembly including a pair of relatively large non-swivealable wheels and a pair of relatively smaller swivealable wheels, the improvement comprising:

a pair of seat supports, one of said seat supports supported on said main frame assembly and the other of said seat supports being adapted to be supported on the seat of a motor vehicle, said other of said seat supports having a vehicle seat engaging surface of such size and shape that it can be supported on the seat of a motor vehicle between the front and rear edges thereof, each of said pair of seat supports having a surface thereon defining at least one track which aligns with the track of the other of said pair of seat supports when positioned end-to-end therewith, a transfer seat having track engagement means which engage said track and permit sliding of said transfer seat from a first position in which said transfer seat is supported on said one seat support to a second position in which said transfer seat is supported on said other of said seat supports, releasable locking means for releasably locking said transfer seat in position on said main frame assembly, and swivel means for rotatably mounting said one of said seat supports with respect to said main frame assembly so that said one seat support may be swivelled with respect to said main frame assembly from a first position in which it is facing in the direction of rolling movement of said relatively larger non-swivelable wheels, to a second position in which it is facing in a direction transverse to said direction of rolling movement, whereby said wheelchair can be moved into close proximity with the seat of a motor vehicle to facilitate movement of said transfer seat therebetween.

2. A wheelchair according to claim 1, wherein said swivel means comprises a swivel post extending upwardly from the main frame assembly and depending surfaces on the seat support frame assembly which engage the swivel post for swivel movement of the seat support frame assembly with respect to the main frame assembly, and releasable clamp means operable to clamp those said frame assemblies together to inhibit such swivel movement.

3. Improvements according to claim 2 wherein each said seat support is a sheet metal tray, and each said track is defined by surfaces of a groove.

4. Improvements according to claim 3 wherein said track engagement means comprise rods secured to the underside of said transfer seat arranged to be supported by said groove surfaces to said tracks.

5. Improvements according to claim 3 wherein transfer seat support comprises an aperture, and further comprising a cushion positionable within the aperture but slidable away from the aperture thereby providing toilet facilities.

6. Improvements according to claim 2 wherein said vehicle seat support further comprises an abutment flange depending from one edge and arranged to abut the side of a vehicle seat when said vehicle seat support is supported by said vehicle seat.

7. Improvements according to claim 6 wherein said abutment flange defines a shallow groove engageable by a flange depending from the first said seat support on the wheelchair frame.

8. Improvements according to claim 7 further comprising a laterally extending tongue on said vehicle seat support which releasably engages the first said seat support and assists in locating the respective supports with respect to one another.

9. Improvements according to claim 2 further comprising an elevating jack between said main frame and seat support frame assemblies operable to raise or lower said seat support frame assembly.

10. Improvements, according to claim 9, wherein said seat support frame assembly comprises a sub-frame beneath said seat support, and tilt control screw jacks between the sub-frame and that said seat support.

11. Improvements according to claim 2 wherein said main frame assembly comprises a base frame, two large wheels and two relatively small wheels, said wheels supporting the base frame, the base frame also comprising telescopically adjustable means whereby the space between the large wheels and the small wheels can be varied.

12. Improvements according to claim 11 wherein each small wheel is itself carried on a replaceable support arm, and retaining means releasably retain said replaceable support arm to the base frame.

13. Improvements according to claim 2 wherein said seat support frame assembly comprises a pair of arm rests, one of said arm rests being carried on telescopic supports and laterally adjustable and removable with respect to the other arm rest, and further comprising clamping means securing that arm rest to the seat support frame assembly, but being releasable for said lateral adjustment or removal.

14. Improvements according to claim 2 further comprising a locking bracket carried on said transfer seat and releasably engagable with said seat support frame assembly, retaining the transfer seat with respect to that assembly.

15. Improvements according to claim 2 further comprising a foot rest frame of inverted "U" shape pivotted to said main frame, and an angle adjuster cooperable between the foot rest frame and the main frame for adjusting the angle of the foot rest frame.

16. Improvements according to claim 15 further comprising foot rests carried by the foot rest frame, and clamping means between the foot rests and foot rest frame clamping the foot rests thereto at selectable heights.

* * * * *